United States Patent [19]

Pool

[11] Patent Number: 4,634,166
[45] Date of Patent: Jan. 6, 1987

[54] TOOL FOR REPAIR OF RZEPPA TYPE CONSTANT VELOCITY UNIVERSAL JOINT

[75] Inventor: James L. Pool, Clarinda, Iowa

[73] Assignee: Lisle Corporation, Clarinda, Iowa

[21] Appl. No.: 793,968

[22] Filed: Nov. 1, 1985

[51] Int. Cl.⁴ .............................................. B25B 13/12
[52] U.S. Cl. .................................. 294/103.1; 29/278; 81/302
[58] Field of Search ................. 81/302, 306, 342, 355, 81/488, 442; 29/278; 294/34, 103.1

[56] References Cited

U.S. PATENT DOCUMENTS 1,851,116  3/1932  Spiro ................................ 29/278 X Primary Examiner—Frederick R. Schmidt
Assistant Examiner—Maurina Rachuba
Attorney, Agent, or Firm—Allegretti, Newitt, Witcoff & McAndrews, Ltd.

[57] ABSTRACT

A pliers type tool useful for removing and replacing bearings of a Rzeppa or constant velocity type universal joint includes a pair of separable jaws connected with translatable links of a hand tool. The jaws are inserted into the hub of the joint, spread and then the entire hub assembly is pivoted in order to expose the bearings sequentially for removal thereof or replacement thereof in the joint.

6 Claims, 8 Drawing Figures

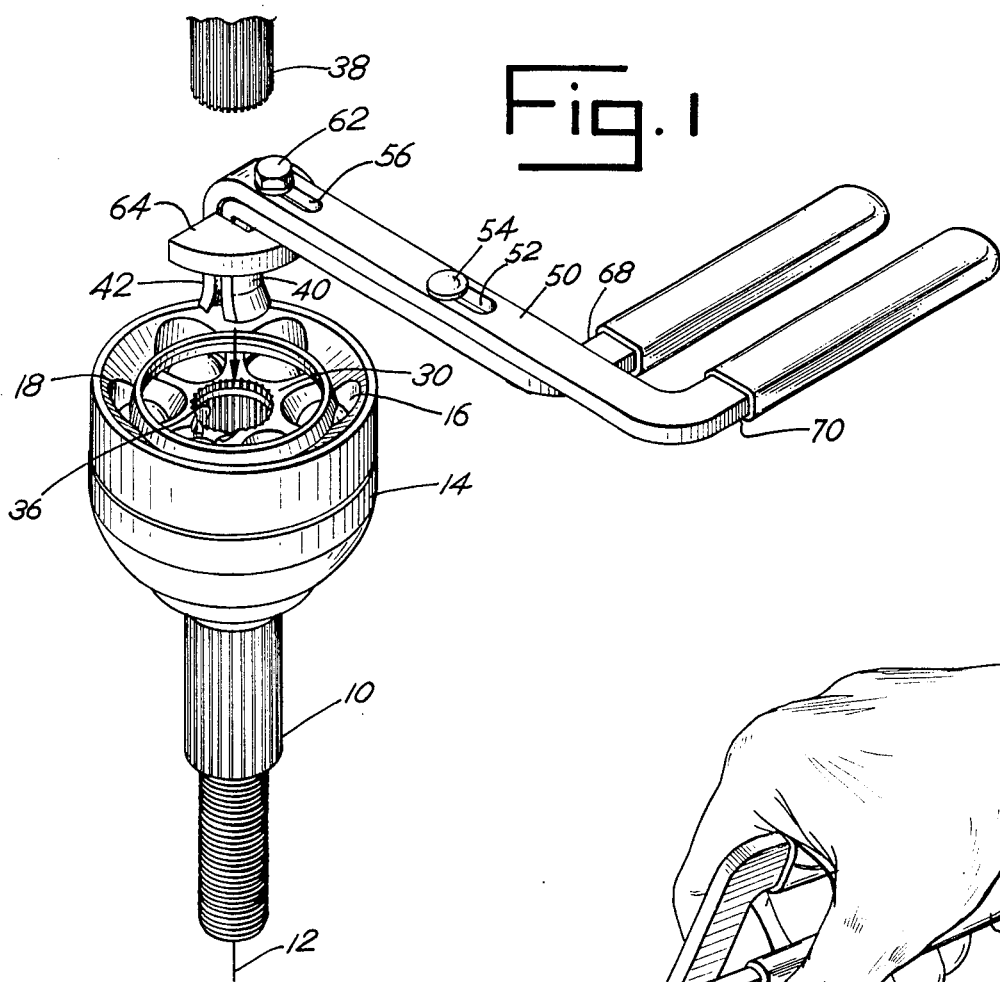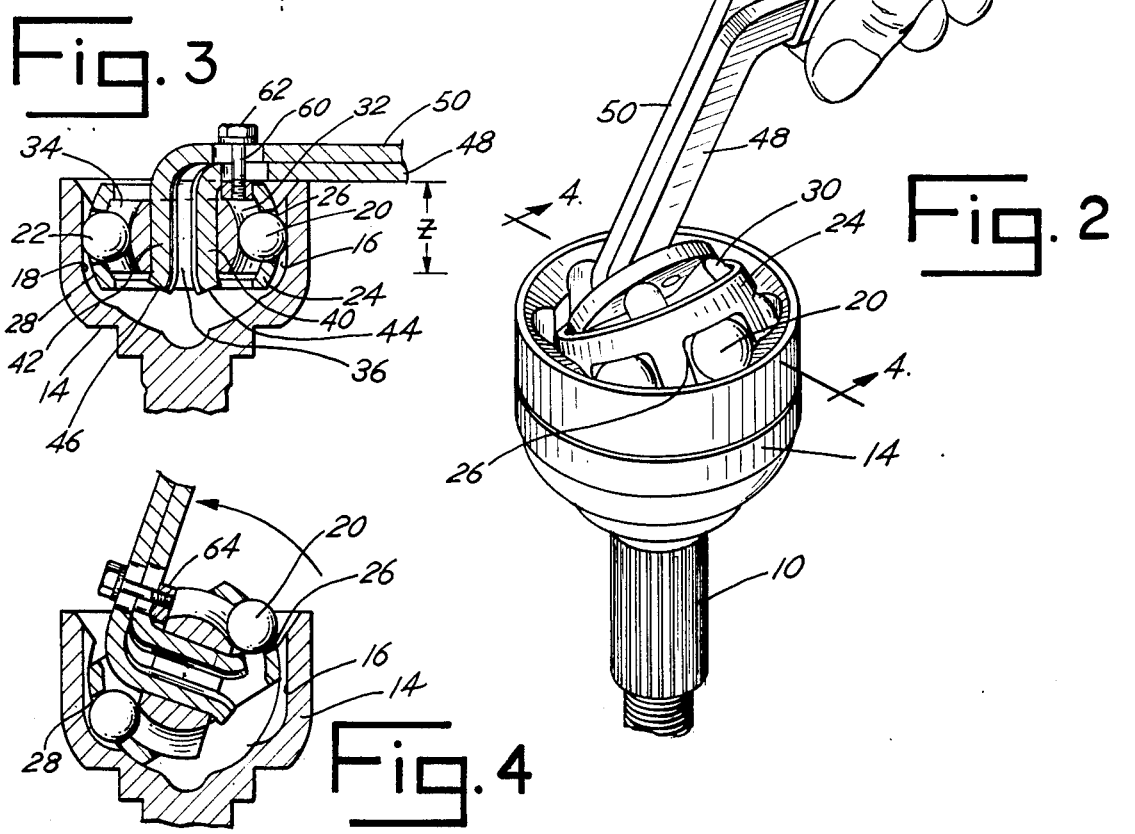

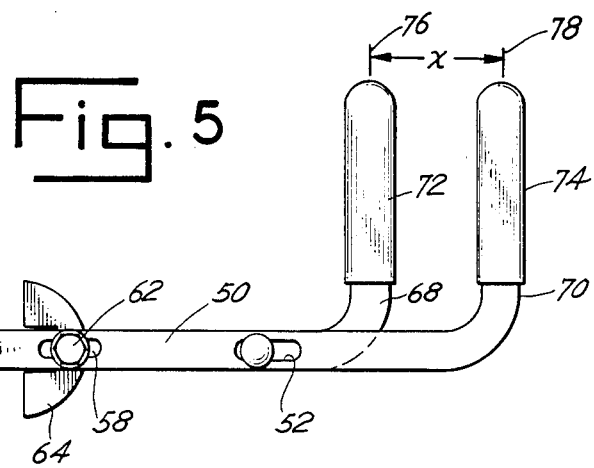
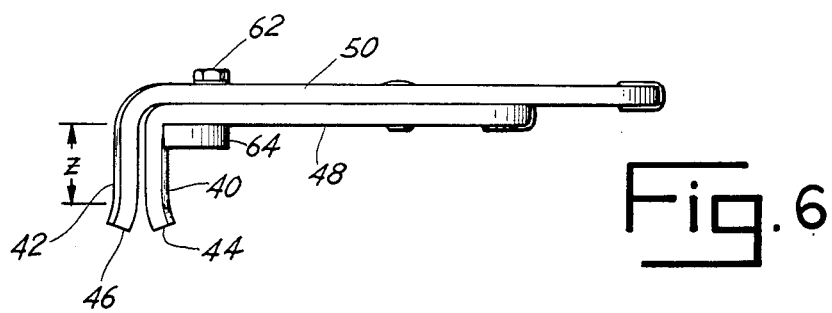
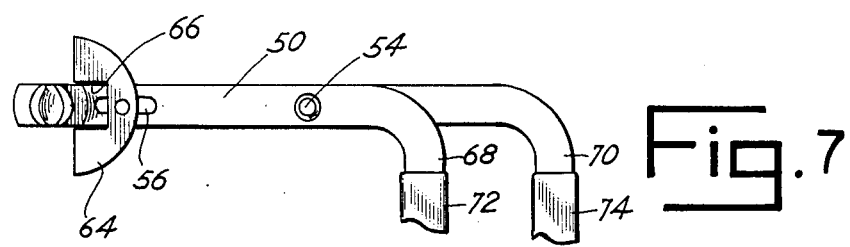
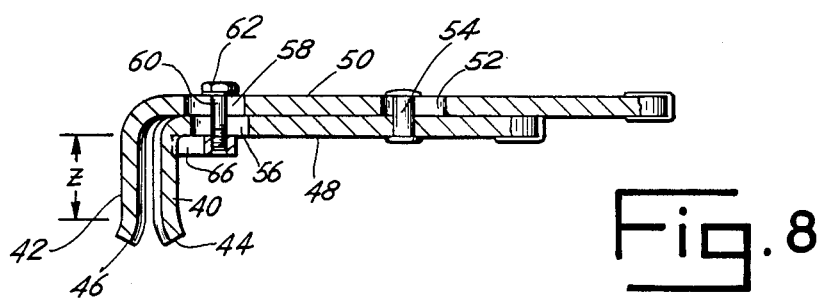

TOOL FOR REPAIR OF RZEPPA TYPE CONSTANT VELOCITY UNIVERSAL JOINT

BACKGROUND OF THE INVENTION

This invention relates to a tool which may be used to remove and replace the bearings of a Rzeppa or constant velocity type universal joint.

Front wheel drive automobiles generally include a drive shaft from the engine connected through a universal joint to a spindle that drives the wheel. A popular type of universal joint utilized with such front wheel drive vehicles is known as a Rzeppa or constant velocity universal joint. Typically a Rzeppa universal joint includes a cup with a projecting spindle. The spindle is attached to a wheel. A series of ball bearings are retained within the cup arranged in a series of radial pockets in the cup. A single ball bearing is retained in each radial pocket by means of a slotted ring and a hub. The hub typically includes a splined opening or passage for receipt of a splined output shaft from the engine. Usually the bearings are enveloped in a lubricant retained within the cup by a boot which fits over the cup and the splined output shaft from the engine.

From time to time it may be necessary to repack the lubricant or grease in the cup. In order to effectively do this, the universal joint is generally removed from the vehicle. The hub, ring and bearings are then removed from the cup. All the component parts are cleaned and the joint is then repacked with grease or other lubricant and reassembled. To effect this procedure, various tools are utilized. Typically the hub, ring and bearings are removed through the use of a hammer and brass chisel. The brass chisel, being relatively soft as compared to the steel parts forming the joint, will hopefully not damage the component steel parts of the joint when the chisel is used to separate the parts. The hammer and chisel are used to move the ring, hub and bearings relative to one another and relative to the cup. This particular procedure is somewhat time consuming and also requires acquisition of a skill with respect to disassembly and reassembly of a joint.

Thus, there has remained a need to provide a tool which can be utilized for the quick and efficient disassembly or assembly of a Rzeppa type universal joint.

SUMMARY OF THE INVENTION

Briefly, the invention comprises a tool especially useful for removal and replacement of bearings in a Rzeppa type universal joint. The tool includes a pair of jaws which are designed to fit within a splined opening in the hub of a Rzeppa joint. The jaws are attached to links which overlie one another and are slidable with respect to one another so that by translation of the links relative to each other, the jaws may be spread to grip the sides of the splined opening in the hub. Handles attached to the links effect translation of the links and spreading of the jaws. After the jaws are positioned to grip the hub, the tool may be pivoted to simultaneously pivot the hub, ring and bearings of the joint within the cup of the joint. By pivoting the tool in various directions relative to the rotation axis of the cup, the hub pivots with respect to the ring and bearings in a manner which permits the bearings to be removed individually from the cup. Consequently all of the bearings may be removed ultimately permitting removal of the hub as well as the ring from the cup. The component parts of the joint may then be cleaned and repacked with grease.

The tool may then be utilized to reverse the process and replace the hub, ring and bearings within the cup.

Thus, it is an object of the invention to provide an improved tool for assembly and disassembly of a Rzeppa type universal joint.

It is a further object of the present invention to provide an improved tool for repair of a Rzeppa type universal joint, and, in particular, a tool which eliminates the need for impacting on the joint with a chisel or the like.

Still another object of the present invention is to provide an improved tool for repair of a Rzeppa type universal joint which is sturdy, economical, easy to utilize and capable of manual operation in a precision manner to effect the desired repair or replacement.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 1 is a perspective view depicting a typical Rzeppa type universal joint and the improved tool of the present invention juxtaposed with respect to that universal joint for engagement with the joint;

FIG. 2 is a perspective view illustrating the improved tool of the invention as positioned in the joint for removal of bearings;

FIG. 3 is a cross sectional view of the jaws of the tool of the invention as inserted into the joint;

FIG. 4 is a cross sectional view of the tool similar to FIG. 3 taken substantially along the line 4—4 in FIG. 2;

FIG. 5 is a top plan view of the tool of the invention;

FIG. 6 is a side elevation of the tool of the invention;

FIG. 7 is a bottom plan view of the tool of the invention; and

FIG. 8 is a side cross sectional view of the tool of the invention taken substantially along the line 8—8 in FIG. 5.

DESCRIPTION OF THE PREFERRED EMBODIMENT

The improved tool of the invention is depicted in detail in FIGS. 5-8. The manner of use of the tool and its general overall configuration is depicted in FIGS. 1-4.

Referring first to FIGS. 1-4, the tool of the invention is designed for use with a Rzeppa type universal joint. Typically such a joint, which is generally used in the drive train of front wheel drive vehicles, includes a spindle 10 defining an axis 12. The spindle 10 projects from a cup 14. The internal configuration of the cup includes a series of curved radial slots such as slot 16 and slot 18 in FIG. 3. A ball bearing 20 is mounted in slot 16. A separate ball bearing 22 is mounted in slot 18. A circular ring 24 has a window or channel 26 for ball bearing 20 and a window or channel 28 for ball bearing 22 positioned in opposed relation to the slots 16 and 18 respectively.

A hub 30 includes a series of opposed slots, such as slot 32 opposed to slot 16 and slot 34 opposed to slot 18. In this manner the slots 16 and 32 define a channel in which a ball bearing 20 may run. Likewise, the slots 18 and 34 define a channel in which the ball bearing 22 may run. In each circumstance the ring 24 and more particularly the window 26, 28 maintains the appropriate bearing in the appropriate slot.

The hub 30 also includes a central splined passage 36. The passage 36 is adapted to receive a splined shaft 38 associated with the drive shaft or output from the vehicle engine. A rubber boot (not shown) fits over the splined shaft 38 and the cup 14 in order to maintain a seal of the materials within the cup 14. That is, the bearings 20 are maintained in a lubricated condition by a quantity of appropriate lubricant such as grease within the cup 14. A boot which fits over the shaft 38 and the cup 14 maintains the lubricant within the confines of the cup 14.

Heretofore when it was necessary to remove old lubricant and replace the lubricant or replace a component part of such a universal joint, the procedure involved removal of shaft 38 followed by tipping of the hub 30 relative to the ring 24 and bearings, e.g. bearing 20, by means of a hammer and brass chisel. Only by impacting the component parts with a chisel relative to one another could the bearings be removed individually from their associated slot. Only after the bearings are removed is it possible to remove the hub 30 and ring 24.

As shown in the drawing, the present invention comprises a tool which can be easily inserted into the passage 36 and then used to disassemble or reassemble the joint. Specifically the tool includes a first jaw 40 and an opposed second jaw 42. The jaws 40 and 42 are substantially identical in shape and arranged in opposed relation. The jaw 40 includes an outwardly displaced end portion 44 as does the jaw 42 which has an end portion 46. The end portions 44 and 46 flair outwardly from one another so that when the jaws 40, 42 are positioned within the passage 36, they will effect a gripping action on the sides of the opening or passage 36 as depicted in FIG. 3. Each jaw 40 and 42 has a longitudinal dimension z in FIGS. 6 and 8 substantially equal to or greater than the length of the passage 36 in the hub 30. The flaired ends 44 and 46 thus extend beyond the passage 36 in the preferred embodiment.

The first jaw 40 is integrally connected with a link or arm 48 that is generally transverse to the jaw 40. Thus, as depicted in FIG. 6, the jaw 40 and link 48 define an "L" shaped configuration. Overlying the link 48 is a second link 50 which is integrally connected with the second jaw 42. Again the configuration of the link 50 and jaw 42 is an "L" shape.

The links 48 and 50 are in the form of planar members, slidable relative to each other. That is, the link 50 includes a longitudinal slot 52 through which a headed pin 54 is positioned. The pin 54 is attached to the first link 48 and projects through the slot 52 to limit the translation or slidable movement of the first link 48 relative to the second link 50.

Also extending through a second slot 56 in the first link 48 and a third slot 58 in the second link 50 is a bolt 60 having a head 62. The bolt 60 is threaded into a small semicircular plate 64 positioned against the bottom side of link 48. The semicircular plate 64 includes a notch 66 having a lateral dimension sufficient to receive the jaw 40 or the jaw 42. The bolt 60 slides freely in the slots 56 and 58 and permits the plate 64 to slide freely with respect to both of the links 48 and 50. The bolt 60 has the function of maintaining the links 48 and 50 together in an overlying relationship so that sliding movement limited by the slot 52 and rivet or pin 54 will be maintained in a specific direction. Thus, the bolt 60 and the rivet 54 define or guide the relative sliding movement of the links 48 and 50 with respect to one another.

The bolt 60, however, is freely slidable within the slots 56 and 58 so that the plate 64 may move relative to both of the jaws 40 and 42. The plate 64 fits on top of the hub 30 as depicted in FIGS. 3 and 4 and against the inside surface of the ring 24 so as to assist in positioning of the tool within the joint which is being assembled or disassembled.

Extending transversely from the links 48 and 50 respectively are handles 68 and 70 respectively. Handles 68, 70 are generally coplanar with the respective links 48, 50. Grips 72 and 74 are provided on the handles 68, 70 for manual gripping of the handles 68 and 70. The handles 68 and 70 define lateral axes 76 and 78 which are spaced from one another by a distance x which is variable depending upon the position of the handles 68, 70. As the distance x is decreased, the spacing of the jaws 40 and 42 is increased due to the sliding movement of the links 48 and 50 with respect to one another.

In operation, after the jaws 40 and 42 are inserted in the passage 36, the handles 68 and 70 are gripped and squeezed thereby expanding the jaws 40 and 42 against the opposite sides of the passage 36. Thus, the jaws 40 and 42 are inserted in the passage 36 in the manner depicted by FIG. 3. The plate 64 is nestled against the hub 30 and the ring 24 to properly align the tool. The handles 68 and 70 are gripped and squeezed together so that the jaws 40 and 42 may be expanded. The hub 30 and ring assembly 24 is then rotated in the manner depicted in FIG. 2 by movement of the tool about axis 12 so that a bearing such as bearing 20 will slide in its appropriate slot 16 and simultaneously the hub 30 will rotate in a relatively greater arc guided by the tool. In this manner the bearing 20 is exposed and can be removed from the cup 14. Subsequently, the tool is reoriented so that the bearing of another slot may be removed from the cup 14. In sequence all of the bearings are removed from the cup 14 by virtue of the angular rotation of the hub 30 and ring 24 in response to actuation of the tool about axis 12.

Once the bearings have been removed, then the hub 30 and ring 24 may be lifted from the cup 14. The cup 14, bearings 20, 22, hub 30 and ring 24 may all then be cleaned and repacked with an appropriate lubricant. In order to reassemble the joint, the reverse procedure is followed. That is, the ring 24 and hub 30 are first inserted within the cup 14 and held by the tool positioned in the passage 36. Subsequently single bearings are positioned within windows or slots 26, 28 of the ring 24 once the ring 24 is positioned as shown in FIG. 2 for receipt of a bearing. This procedure is followed in a sequence for each of the bearings and the entire joint is then reassembled.

With the tool of the present invention, it is therefore possible to provide an improved means for assembling or disassembling a Rzeppa type universal joint. The necessity for impacting on the joint with a brass chisel, for example, is avoided. This avoids the potential for scratching or otherwise damaging the component parts of the joint. Additionally, the accidental introduction of brass shavings or shards into the joint is avoided. Thus, while there has been set forth a preferred embodiment of the invention, it is to be understood that the invention is to be limited only by the following claims and their equivalents.

What is claimed is:

1. A tool useful for removing and replacing bearings of a Rzeppa or constant velocity type universal joint of the kind having a cup with an assembly of a hub, ring and bearings in the cup, said cup having a shaft therefrom defining an axis of the joint, said hub having a passage for receipt of a shaft, said tool comprising in combination:

first and second separable jaw members, each member comprising a generally longitudinal bar, said jaw members arranged in opposed longitudinal relationship, said jaws sized to be positionable in the shaft passage in the hub of the joint;

first and second links attached respectively to the first and second jaw members, said links overlying each other, said links extending generally transversely from the jaw members and slidable in said transverse direction relative to each other to control separation of the jaws in the same transverse direction; and first and second handles attached to the first and second links respectively, said handles separated in the transverse direction from each other and manually manipulatable to slide the first link relative to the second link and thereby to adjust the transverse spacing of the jaw members in the shaft passage to engage the passage walls so as to permit pivotal movement of the hub relative to the ring and cup upon simultaneous movement of the handles toward and away from the axis of the joint.

2. The tool of claim 1 including a mounting plate attached to one of the links, said mounting plate shaped to engage the hub independent of the ring and facilitate independent movement of the hub relative to the ring.

3. The tool of claim 1 wherein the handles project generally transversely from their associated link in the same direction so that said handles are parallel and spaced from one another, said handles and links being generally coplanar and defining a plane transverse to the longitudinal axis of the jaws.

4. The tool of claim 1 wherein one of the links includes a slot and also including a pin projecting from the other link through the slot.

5. The tool of claim 1 wherein one of the links includes a pair of slots, and the other link a pin member, projecting therefrom through one of the slots to limit sliding movement of the links, and also including a second pin member through the other slot to maintain alignment of the links.

6. The tool of claim 4 including a head on one pin to hold the links together.

* * * * *